(12) United States Patent
Bucher et al.

(10) Patent No.: US 10,527,179 B2
(45) Date of Patent: Jan. 7, 2020

(54) BALL VALVE WITH IMPROVED ASSEMBLY CONFIGURATION

(71) Applicant: Dramm Corporation of Manitowoc, Manitowoc, WI (US)

(72) Inventors: Jeffrey Thomas Bucher, Fond du Lac, WI (US); Logan Brent Berge, Manitowoc, WI (US)

(73) Assignee: Dramm Corporation of Manitowoc, Manitowoc, WI (US)

( * ) Notice: Subject to any disclaimer, the term of this patent is extended or adjusted under 35 U.S.C. 154(b) by 129 days.

(21) Appl. No.: 15/819,446

(22) Filed: Nov. 21, 2017

(65) Prior Publication Data

US 2019/0154159 A1    May 23, 2019

(51) Int. Cl.
*F16K 5/06* (2006.01)
*F16K 27/06* (2006.01)
*F16K 31/60* (2006.01)

(52) U.S. Cl.
CPC .......... *F16K 5/0636* (2013.01); *F16K 5/0689* (2013.01); *F16K 5/0694* (2013.01); *F16K 27/067* (2013.01); *F16K 31/602* (2013.01)

(58) Field of Classification Search
CPC .... F16K 5/0636; F16K 5/0694; F16K 5/0689; F16K 31/602; F16K 27/067
USPC ...................................................... 251/315.2
See application file for complete search history.

(56) References Cited

U.S. PATENT DOCUMENTS

| | | | | |
|---|---|---|---|---|
| 1,384,159 A | * | 7/1921 | Schenker | F16K 5/08 251/286 |
| 2,839,074 A | * | 6/1958 | Kaiser | F16K 5/0636 137/315.18 |
| 3,960,365 A | * | 6/1976 | Horowitz | F16K 51/00 251/286 |
| 4,072,291 A | * | 2/1978 | Adams | F16K 5/04 137/269.5 |
| 4,076,211 A | * | 2/1978 | Krechel | F16K 5/0605 251/286 |
| 4,109,673 A | * | 8/1978 | Horowitz | B60T 17/043 137/381 |
| 4,280,522 A | * | 7/1981 | Pechnyo | F16K 5/0673 137/72 |

(Continued)

FOREIGN PATENT DOCUMENTS

| | | |
|---|---|---|
| JP | 08303614 | 11/1996 |
| KR | 20000017695 | 10/2000 |
| KR | 20110067753 | 6/2011 |

OTHER PUBLICATIONS

International Searching Authority, "International Search Report and Written Opinion," issued in connection with International Patent Application No. PCT/US2018/058501, dated Feb. 1, 2019, 11 pages.

*Primary Examiner* — Marina A Tietjen
(74) *Attorney, Agent, or Firm* — Reinhart Boerner Van Deuren s.c.

(57) ABSTRACT

A ball valve configured for reduced-time assembly for use with hoses and watering devices typically connected to city water supplies. In particular, the valve is configured to improve the ease of assembly by providing a one-piece snap in handle, ball and retention arrangement which interacts with a seal supported in the valve body to retain the position of the seal during insertion of the one-piece element during valve assembly.

10 Claims, 14 Drawing Sheets

(56) References Cited

U.S. PATENT DOCUMENTS

| | | | | | |
|---|---|---|---|---|---|
| 4,709,902 | A | * | 12/1987 | Hansen | F16K 5/0668 251/315.08 |
| 5,031,876 | A | * | 7/1991 | Giacomini | F16K 5/0647 251/312 |
| 7,549,445 | B2 | * | 6/2009 | Mikiya | F16L 37/373 137/625.22 |
| 2001/0035514 | A1 | | 11/2001 | Laskaris et al. | |
| 2015/0308576 | A1 | | 10/2015 | Yelkin et al. | |

* cited by examiner

BALL VALVE WITH IMPROVED ASSEMBLY CONFIGURATION

BACKGROUND OF THE INVENTION

The present invention relates to a ball valve having molded plastic components. In particular, the valve is configured to improve the ease of assembly by providing a one-piece snap in handle, ball and catch element which interacts with a seal supported in the valve body to retain the position of the seal during insertion of the one-piece element during valve assembly.

SUMMARY OF THE INVENTION

One embodiment provides a ball valve including a one-piece, integrally-molded, plastic flow-control assembly. The assembly includes a partial ball defining a first cylindrical flow passage having a central axis, a lower cylindrical shaft extending from one side of the ball and having a central, rotational axis which is perpendicular to the central axis, a catch arrangement extending from the lower cylindrical shaft including at least one projection, an upper cylindrical shaft having a first radius and extending from the from the side of the ball opposite to the one side and being disposed about the rotational axis, and a bearing journal having a second radius greater than the first radius, extending from the upper cylindrical shaft and disposed about the rotational axis. The assembly also includes a user-handle extending from the journal. The lower cylindrical shaft includes a first cylindrical grove and the journal includes a second cylindrical grove. A first seal is located in the first cylindrical groove, and a second seal is located in the second cylindrical groove. The valve also includes a one piece valve body. The body defines a second cylindrical flow passage having a second central axis, and lower and upper bearing surfaces disposed about the rotational axis. The lower bearing surface is adjacent to a cylindrical ridge which is engaged by the projection to prevent movement of the assembly from within the valve body. The upper bearing surface is disposed about the upper cylindrical shaft and the second seal and includes a shoulder to limit movement, and define the position, of the assembly within the valve body along the rotational axis. The valve body further defines a cylindrical valve seat grove defined by a first cylindrical seat surface and a first cylindrical wall adjacent to the flow passage, the valve seat being located adjacent to the ball. A ball seal includes a first surface configured to conform to the surface of the ball and a first cylindrical extension which is located within the valve seat. The assembly, seals and valve body cooperate to permit rotation of the assembly between (i) a closed position wherein the ball and the ball seal cooperate to prevent fluid flow through the central flow passage such that fluid pressure within the valve forces the ball against the ball seal, and (ii) open positions wherein the assembly is rotated within the valve body such that fluid can flow through the first and second flow passages.

Another embodiment provides a two piece valve. This valve includes a one-piece, integrally-formed flow-control assembly including a partial ball defining a first cylindrical flow passage having a central axis, a lower cylindrical shaft extending from one side of the ball and having a central, rotational axis which is perpendicular to the rotational axis, an upper cylindrical shaft having a first radius and extending from the from the side of the ball opposite to the one side and being disposed about the rotational axis, and a bearing journal having a second radius greater than the first radius, extending from the upper cylindrical shaft and disposed about the central axis. The assembly also includes a user-handle extending from the journal. The lower cylindrical shaft includes a first seal located in a first cylindrical grove and the journal includes a second seal located in a second cylindrical grove. The valve also includes a one piece, integrally formed valve body. The body defines a second cylindrical flow passage having a second central axis, lower and upper bearing surfaces disposed about the rotational axis, the upper bearing surface being disposed about the upper cylindrical shaft and the second seal and including a shoulder to limit movement, and define the position, of the assembly within the valve body along the rotational axis. The valve body also defines a cylindrical valve seat grove defined by a first cylindrical seat surface and a first cylindrical wall adjacent to the flow passage. The valve seat is located adjacent to the ball and a ball seal is positioned at the valve seat. The ball seal includes a first surface configured to conform to the surface of the ball and a first cylindrical extension which is located within the valve seat. The assembly, seals and valve body cooperate to permit rotation of the assembly between (i) a closed position wherein the ball and the ball seal cooperate to prevent fluid flow through the central flow passage such that fluid pressure within the valve forces the ball against the ball seal, and (ii) open positions wherein the assembly is rotated within the valve body such that fluid can flow through the first and second flow passages.

Another embodiment provides a method for assembling a two-piece valve and seal. The method includes locating seals within cylindrical groves of a one-piece, integrally-molded, plastic flow-control assembly which includes a partial ball defining a first cylindrical flow passage having a central axis. A lower cylindrical shaft extends from one side of the ball and has a central, rotational axis which is perpendicular to the central axis, an upper cylindrical shaft having a first radius and extending from the from the side of the ball opposite to the one side and is disposed about the central axis, and a bearing journal having a second radius greater than the first radius, extending from the upper cylindrical shaft and disposed about the central axis. The assembly also includes and a user-handle extending from the journal. The lower cylindrical shaft includes one of the cylindrical grooves and the journal includes the other of the cylindrical grooves. The method also includes locating a ball seal, including a first surface configured to conform to the surface of the ball, within the valve body such that a first cylindrical extension of the ball seal is located within a valve seat in a valve body. The valve body defines a second cylindrical flow passage having a second central axis, the flow body defining lower and upper bearing surfaces disposed about the rotational axis, the lower bearing surface being adjacent to a cylindrical ridge which is engaged by the projection to prevent movement of the assembly from within the valve body, the upper bearing surface being disposed about the upper cylindrical shaft and the second seal and including a shoulder to limit movement, and define the position, of the assembly within the valve body along the rotational axis. The valve body defines a cylindrical valve seat grove defined by the cylindrical seat surface and a first cylindrical wall adjacent to the flow passage with the valve seat being located adjacent to the ball. The method also includes inserting the assembly within the valve body and engaging a retainer assembly with the assembly and the valve body to permit rotation of the flow-control assembly within the valve body while simultaneously restricting removal of the flow-control assembly from the valve body.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
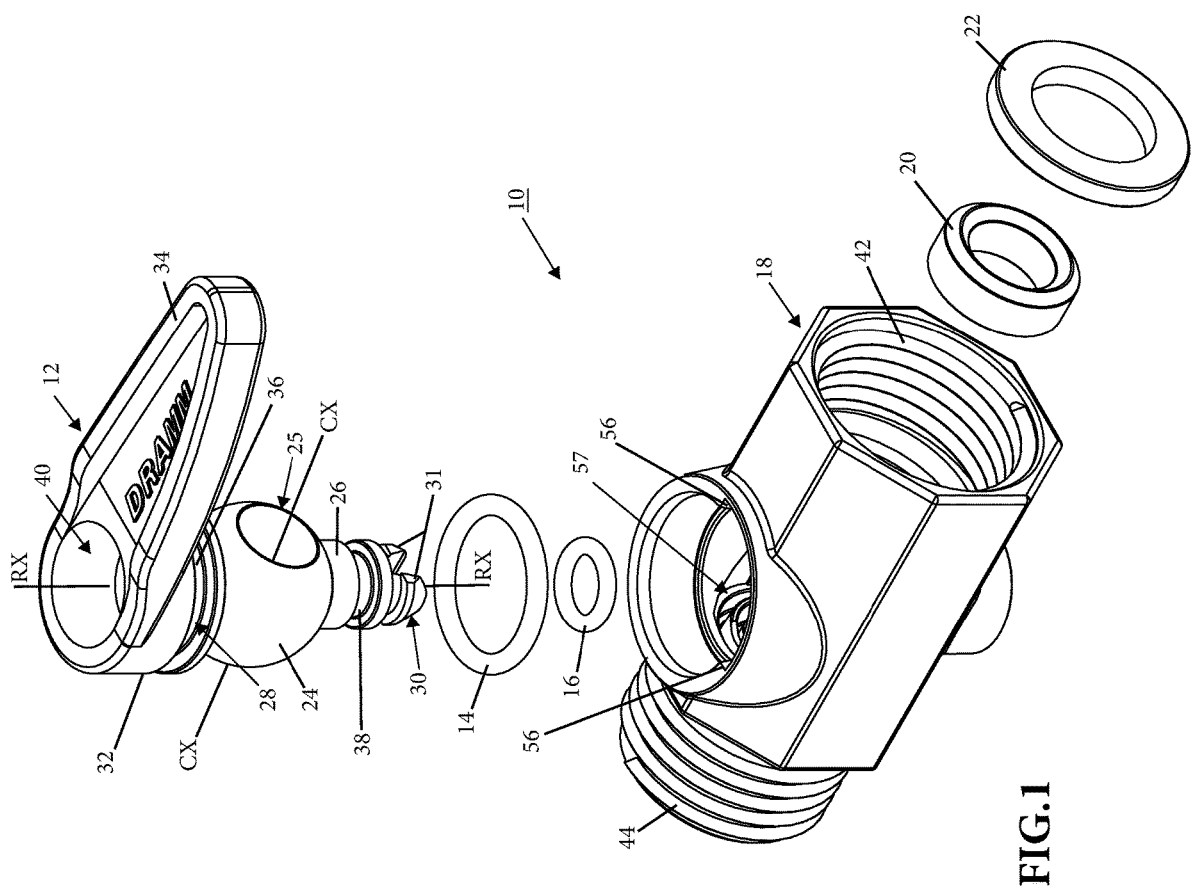
FIG. 1 is an exploded perspective view of an embodiment of the valve.
Figure 2:
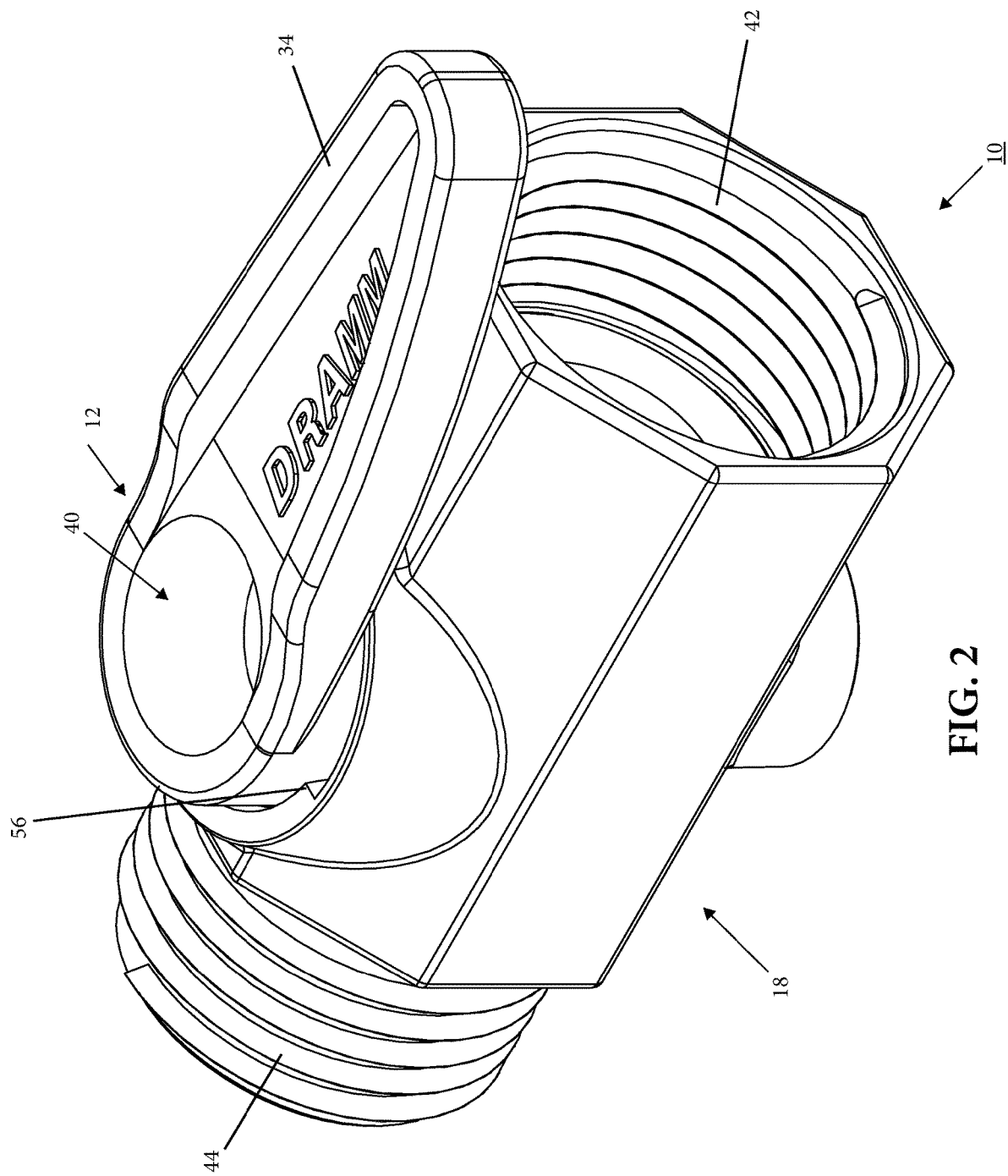
FIG. 2 is a perspective view of an embodiment of a valve.
Figure 3:
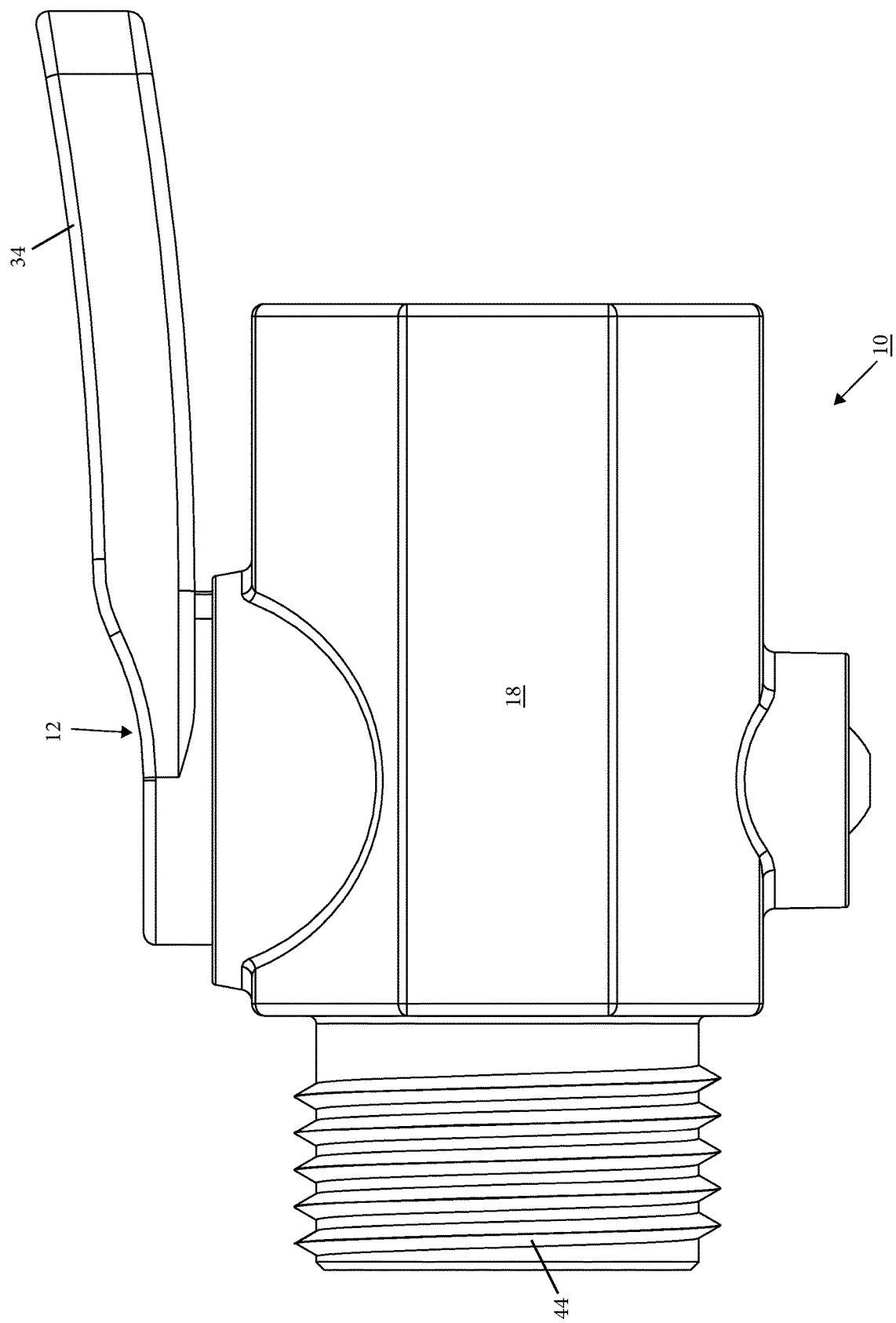
FIG. 3 is a side view of the valve.
Figure 4:
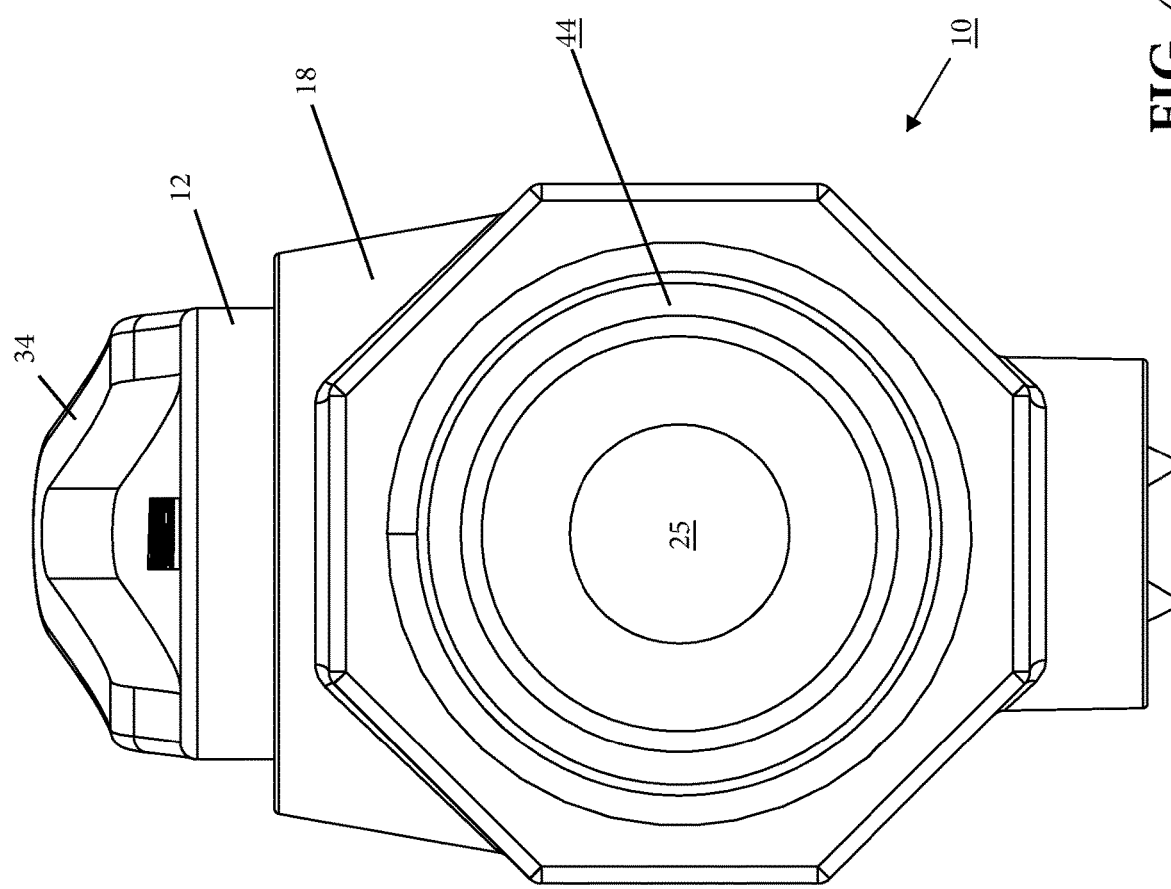
FIGS. 4 and 5 are end views of the valve.
Figure 5:
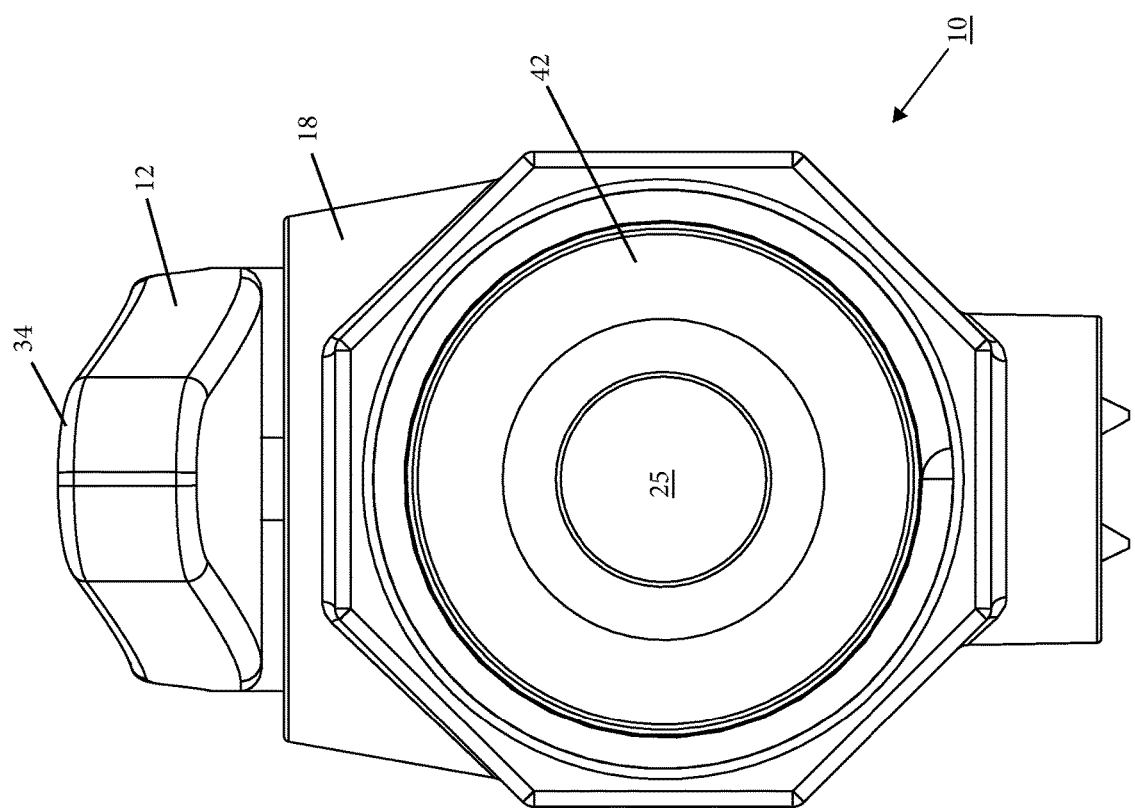
Figure 6:
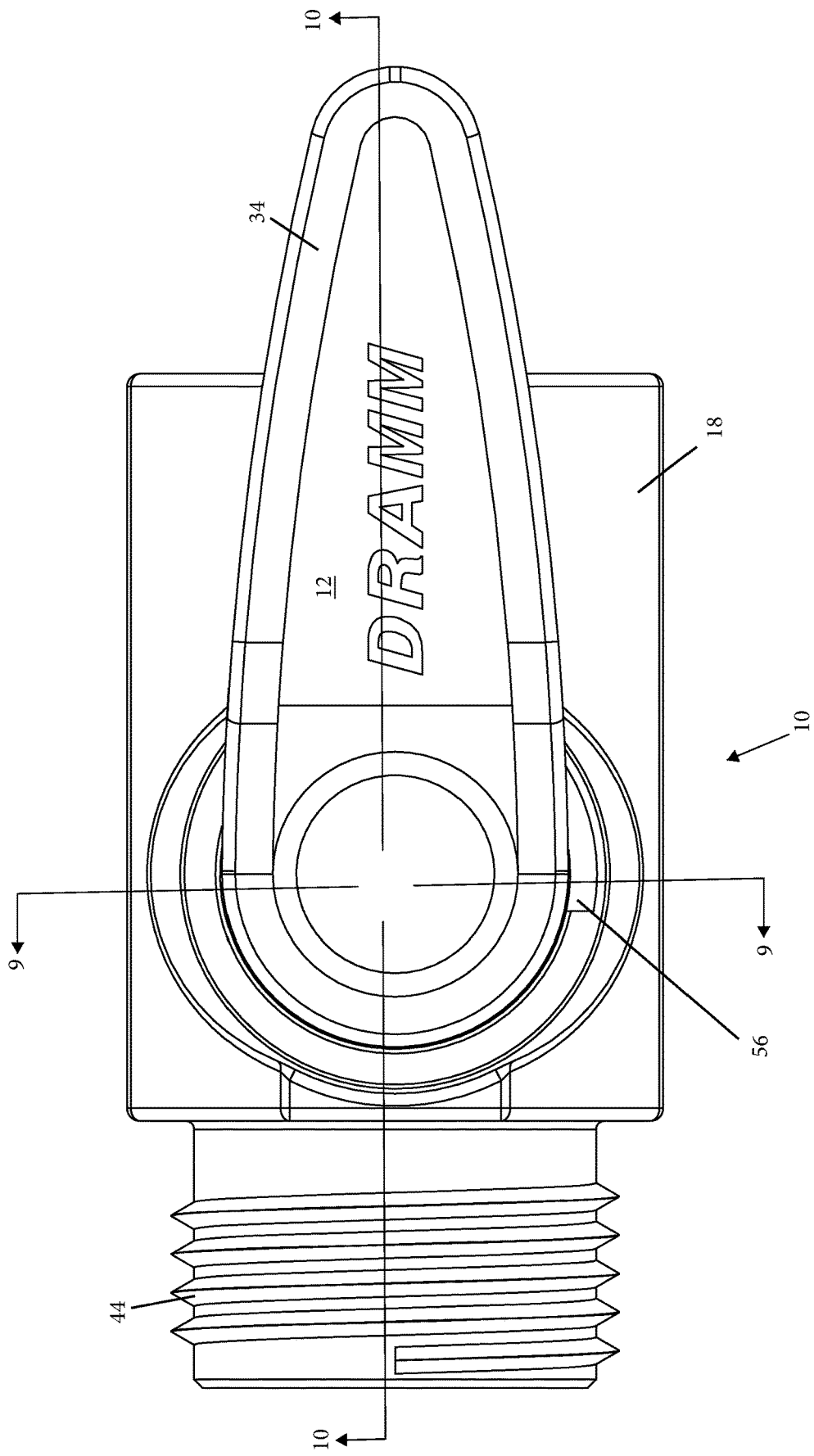
FIG. 6 is a top view of the valve.
Figure 7:
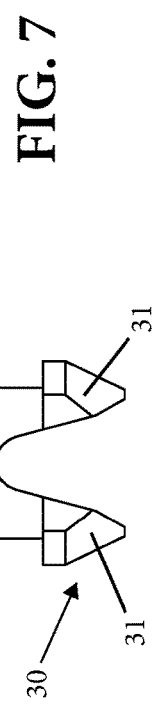
FIG. 7 is an end view of an embodiment of a ball assembly.
Figure 8:
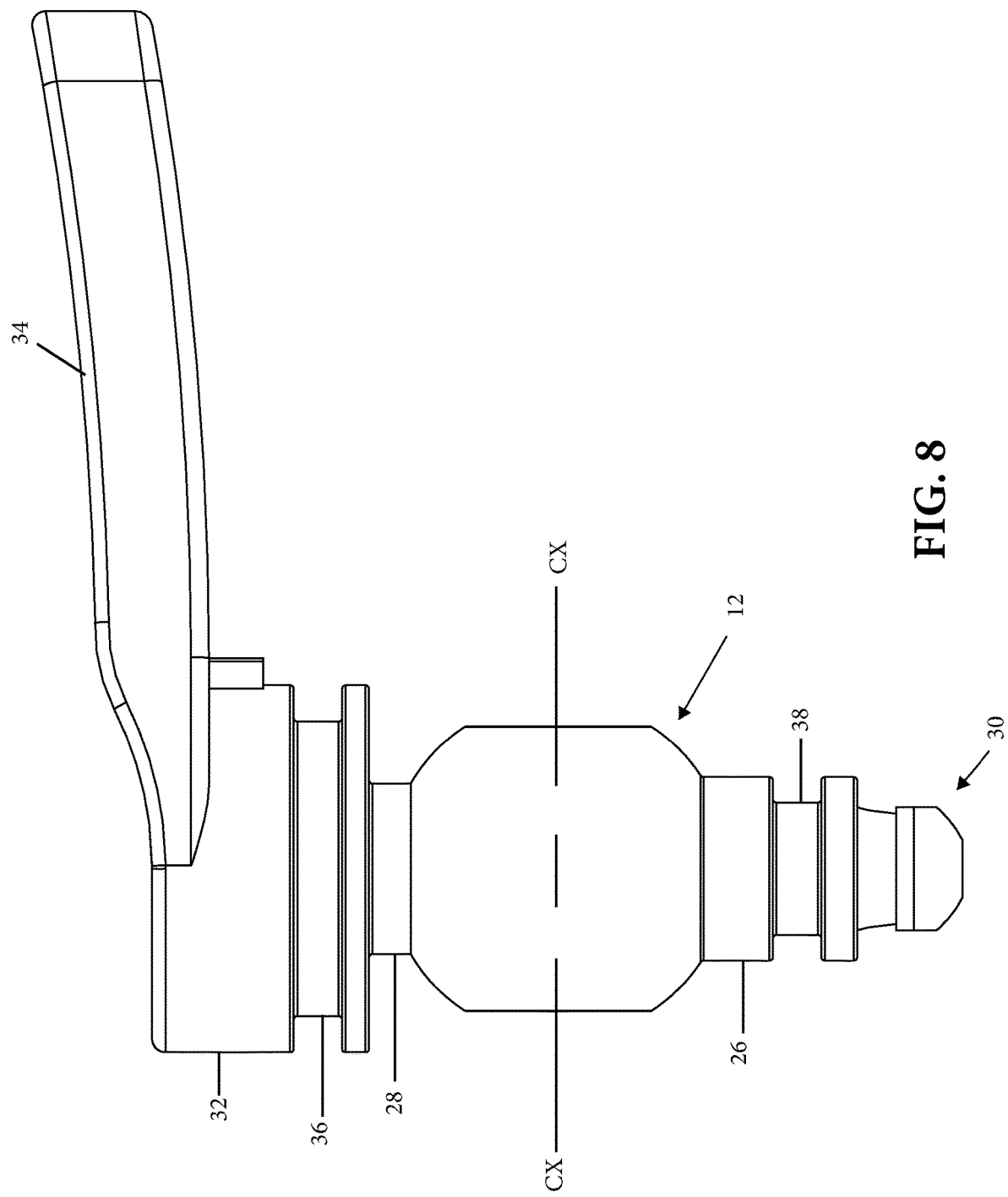
FIG. 8 is a side view of the ball assembly.
Figure 9:
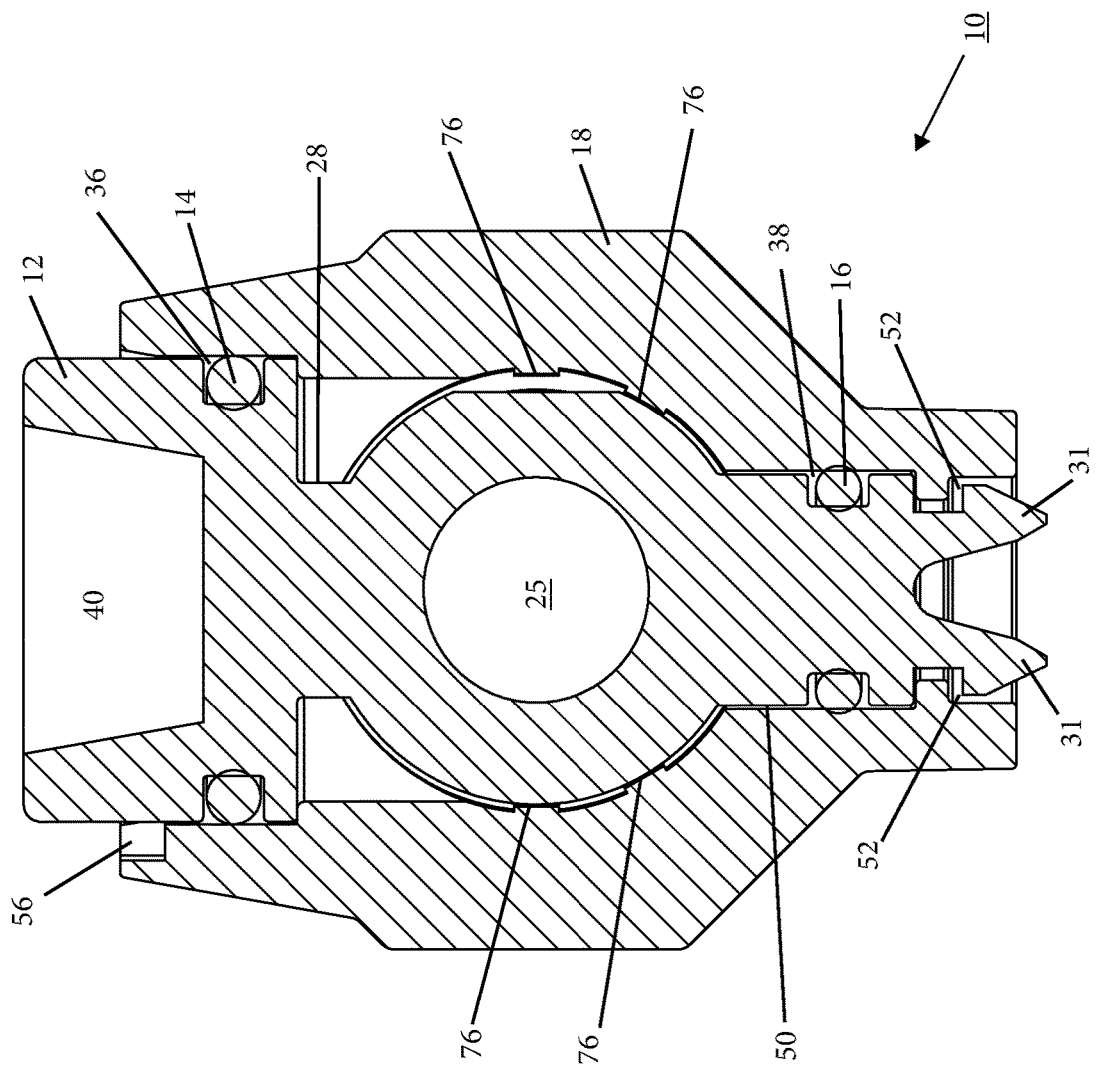
FIG. 9 is a sectional view of the ball valve taken along line 9-9 in FIG. 6.

FIG. 1 illustrates components of a ball valve configured for reduced-time assembly. The valve is for use with hoses and watering devices typically connected to city water supplies. In particular, the valve is configured to improve the ease of assembly by providing (in one embodiment) a one-piece snap in handle, ball and retention arrangement which interacts with a seal supported in the valve body to retain the position of the seal during insertion of the one-piece element during valve assembly. Referring again to FIG. 1, a ball valve 10 includes:

A ball assembly 12;
A top seal 14 (e.g. O-ring);
A bottom seal 16 (e.g. O-ring);
A valve body 18;
A ball valve seal 20; and
An optional cylindrical hose seal 22.

FIGS. 2-6 and 11 illustrate valve 10 with all of the components assembled.

The description of one embodiment of ball assembly 12 is now made in reference to FIGS. 1 and 7-10d. Ball assembly 12 may be a one-piece injection molded plastic structure but could be formed from a metal such as, for example brass or stainless steel. By way of example, the plastic used for assembly 12 may be Polyoxymethylene (POM), also known as acetal, polyacetal and polyformaldehyde, which provides high stiffness, low friction, and an appropriate dimensional stability. One embodiment of assembly 12 includes:

a partial ball 24;
a cylindrical flow passage 25;
a lower cylindrical shaft 26;
an upper cylindrical shaft 28;
a catch arrangement 30;
projections 31;
a bearing journal 32;
a stop 33;
a user handle 34;
a cylindrical groove 36; and
a cylindrical groove 38.

Partial ball 24 includes the cylindrical flow passage 25 which has a central axis CX as shown. The lower cylindrical shaft 26 extends from the bottom side of the ball 24 and is disposed about (i.e. a surface concentric with) a central, rotational axis RX which is perpendicular to the central axis CX. Catch arrangement 30 extends from the lower cylindrical shaft 26 and includes a pair of projections/catches 31. Upper cylindrical shaft 28 has a first radius and extends from the top side of the ball 24 and is disposed about the rotational axis RX. Bearing journal 32 has a second radius greater than the radius of shaft 28. Journal 32 extends upwardly from shaft 26 above groove 36 and is disposed about the rotational axis. User handle 34 is formed integrally with assembly 12 at the top of journal bearing 32. A depression 40 may be formed at the interface between journal bearing 32 and handle 34 to conserve the material from which assembly 12 is fabricated. Depression 40 may also serve as a tooling interface which inserts assembly 12 into valve body 18.

The lower cylindrical shaft includes cylindrical grove 38 and bearing 32 includes second cylindrical grove 36. Seal 14 is located in cylindrical groove 36, and seal 16 is located in cylindrical groove 38.

Valve 10 also includes one piece valve body 18. Valve body 18 may be a one-piece injection molded plastic structure but could be formed from a metal such as, for example brass or stainless steel. By way of example, the plastic used for body 18 may be acrylonitrile butadiene styrene (ABS). An embodiment of valve body 18 will now be described in detail in reference to FIGS. 9-10d. The features of valve body 18 (and seal 20) include:

Female hose threads 42;
Male hose threads 44;
Passage entry 45;
Flow passage 46;
Passage exit 47;
Upper bearing surface 48;
Lower bearing surface 50;
Cylindrical ridge/edge 52;
Bearing shoulder 54;
Rotational stops 56;
Valve seat 57;
Cylindrical valve seal groove 58;
Cylindrical seat surface 59;
Cylindrical wall 60;
Seal surface 62;
Cylindrical extension 64;
Flow surface 66;
Cylindrical extension 68;
Channel 70; and
Cylindrical extension 72.

Valve body 18 is formed to define flow passage 46 which has a passage entry 45 including threads 42 and a passage exit 47 having threads 44. By way of example these threads 42 and 44 may be compatible with a standard garden hose. However, with the increase in use of plastic plumbing in homes, in the case of a plastic valve housing 18 threads 42 and 44 may be of a size to fit standard plumbing fittings or formed to exclude the threads to include a gluing interface with plastic plumbing. In the case of a metal housing 18, threads 42 and 44 may be made compatible with standard plumbing treads or replaced with a smooth surface to provide a soldered plumbing joint (i.e. sweat joint). Flow passage 46 is formed about and concentric with the second flow passage SX.

When valve 10 is assembled lower bearing surface 50 is adjacent to cylindrical ridge 52 which is engaged by the projection 31 to prevent movement of the ball assembly 12 from within the valve body 18 (i.e. upwardly) when the valve 10 is pressurized. The upper bearing surface 48 is disposed about the bearing journal 32 and seals 14 and 16 and includes bearing shoulder 54 to limit movement, and define the position, of the assembly 12 within the valve body 18 along the rotational axis RX.

The valve body 18 further defines a first embodiment of valve seat 57 having cylindrical valve seat grove 58 defined by the cylindrical seat surface 59 and a first cylindrical wall 60 adjacent to the flow passage 46. Valve seat 57 is located adjacent to the ball 24 such that seal 20 is located and supported relative to ball 24 to provide a sealing interface between valve body 18 and ball 24. Ball seal 20 includes a sealing surface 62 configured to conform to the surface of the ball 24. Seal 20 includes a first cylindrical extension 64 which is located within the grove 58 of seat 57

By way of example only, seals 14, 16 and 20 may be molded from a synthetic rubber such as EPDM 70 durometer rubber (ethylene propylene rubber) and a lubricant such as a silicone applied thereto to facilitate manual opening and closing of valve 10.

The assembly 12, seals 14, 16 and 20 and valve body 18 cooperate to permit rotation of the assembly 12 between (i) a closed position wherein the ball 24 and the ball seal 20 cooperate to prevent fluid flow through the central flow passage 46 such that fluid pressure applied by a fluid source to the passage entry 46 forces the ball 24 against the ball seal 20 with axes CX and SX generally perpendicular, and (ii) open position wherein the assembly 12 is rotated within the valve body 18 such that fluid can flow through valve 10 from passage entry 45 through flow passage 25 and out passage exit 47 when axes CX and SX are moved from their generally perpendicular orientation.

To limit rotation of valve body 18 between the valve 10 fully open position (i.e. axes CX and SX generally parallel) and the valve 10 fully closed position (i.e. axes CX and SX generally perpendicular), journal bearing 32 is provided with a stop 33 which is positioned on bearing 32 to interact with rotational stops 56. In one embodiment, stops 33 and 56 are position such that valve 10 is fully open when handle 34 is positioned as shown in the Figures and fully closed when handle 34 is rotated generally perpendicular to the position of handle 34 shown in the Figures.

Figure 10A:
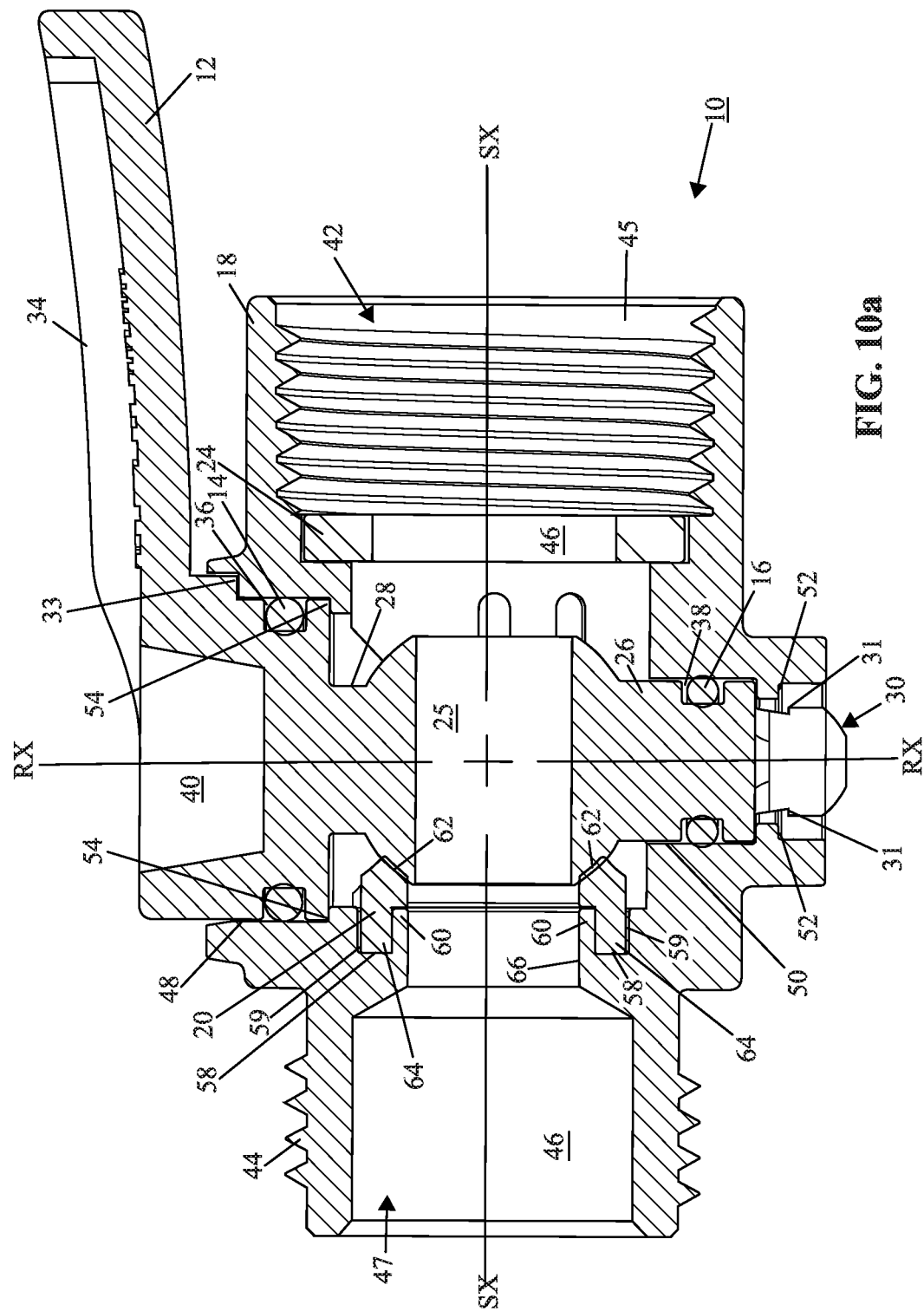
FIG. 10a is a sectional view of one embodiment of the valve with a first embodiment of a ball valve seat.
Figure 10B:
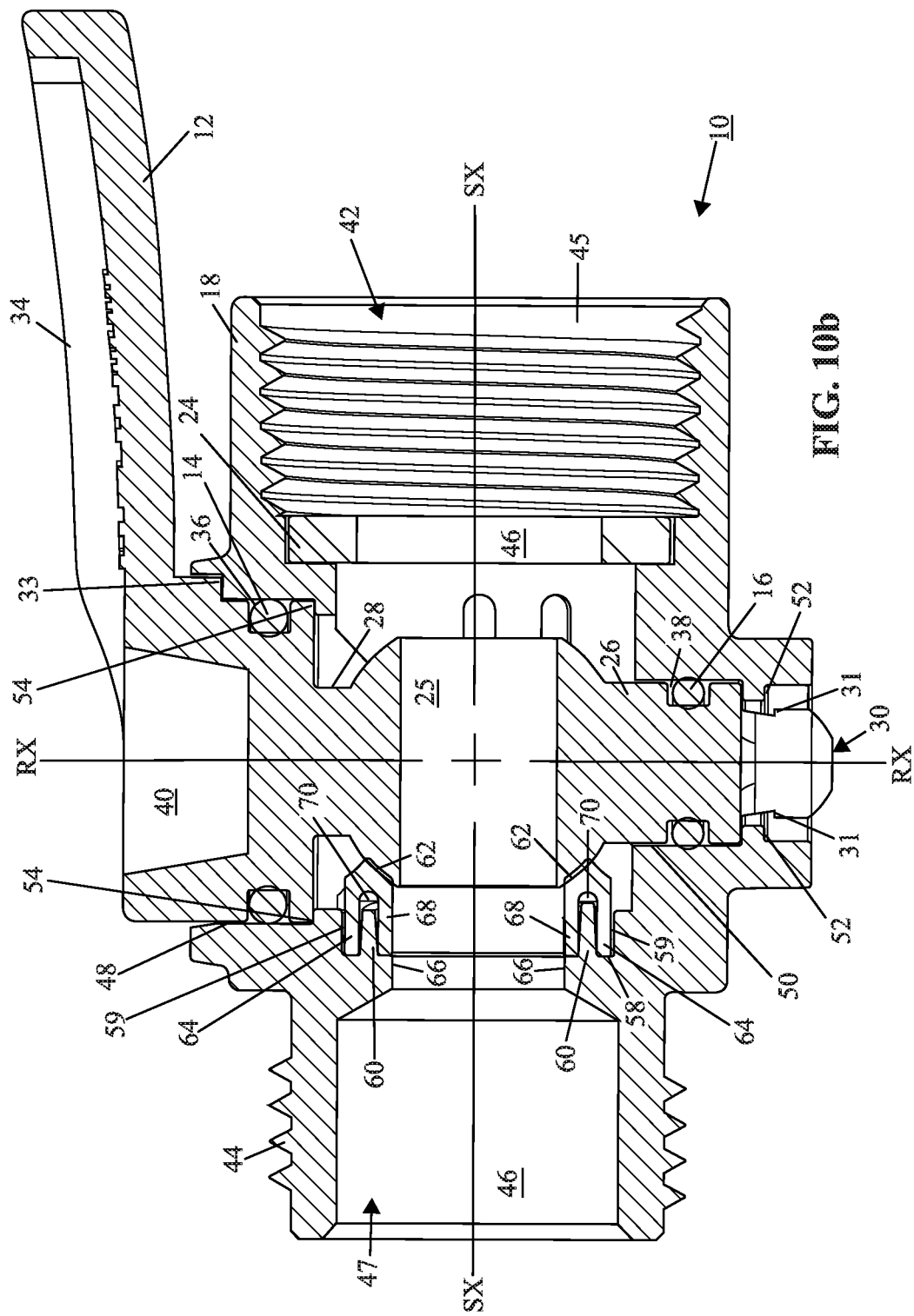
FIG. 10b is a sectional view of one embodiment of the valve with a second embodiment of a ball valve seat.

Referring now to FIG. 10b, a second embodiment of valve seat 57 and corresponding ball seal 20 will be described. In the first embodiment cylindrical wall 60 forms a portion of the flow surface 66 of passage exit 47 which is believed to provide less turbulence at that location in valve 10 during fluid flow. However, an important feature of the embodiments of the valve seat 57 and seal 20 is that the seal 20 stays within the seat 57 when ball assembly 12 is forced down into housing 18 during assembly. The first embodiment provides this feature. The second embodiment also provides this feature, but cylindrical wall 60 is offset from the flow surface 66 as shown in FIG. 10b. With this embodiment, seal 20 includes a second cylindrical extension 68 which cooperates with the first cylindrical extension 64 to provide a channel 70 engaged by wall 60. In this embodiment, extension 68 provides a portion of flow surface 66.

Figure 10C:
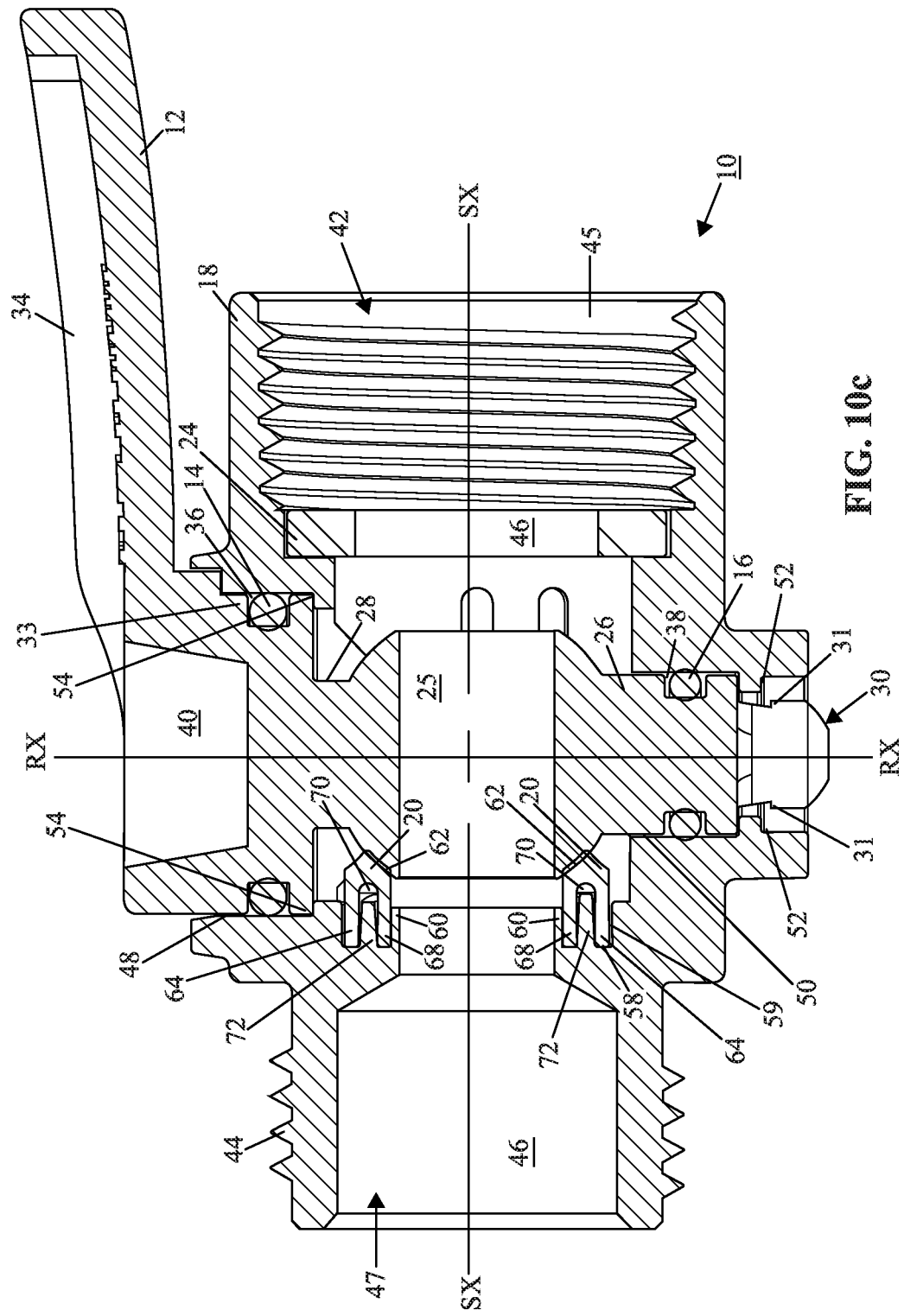
FIG. 10c is a sectional view of one embodiment of the valve with a third embodiment of a ball valve seat.
Figure 10D:
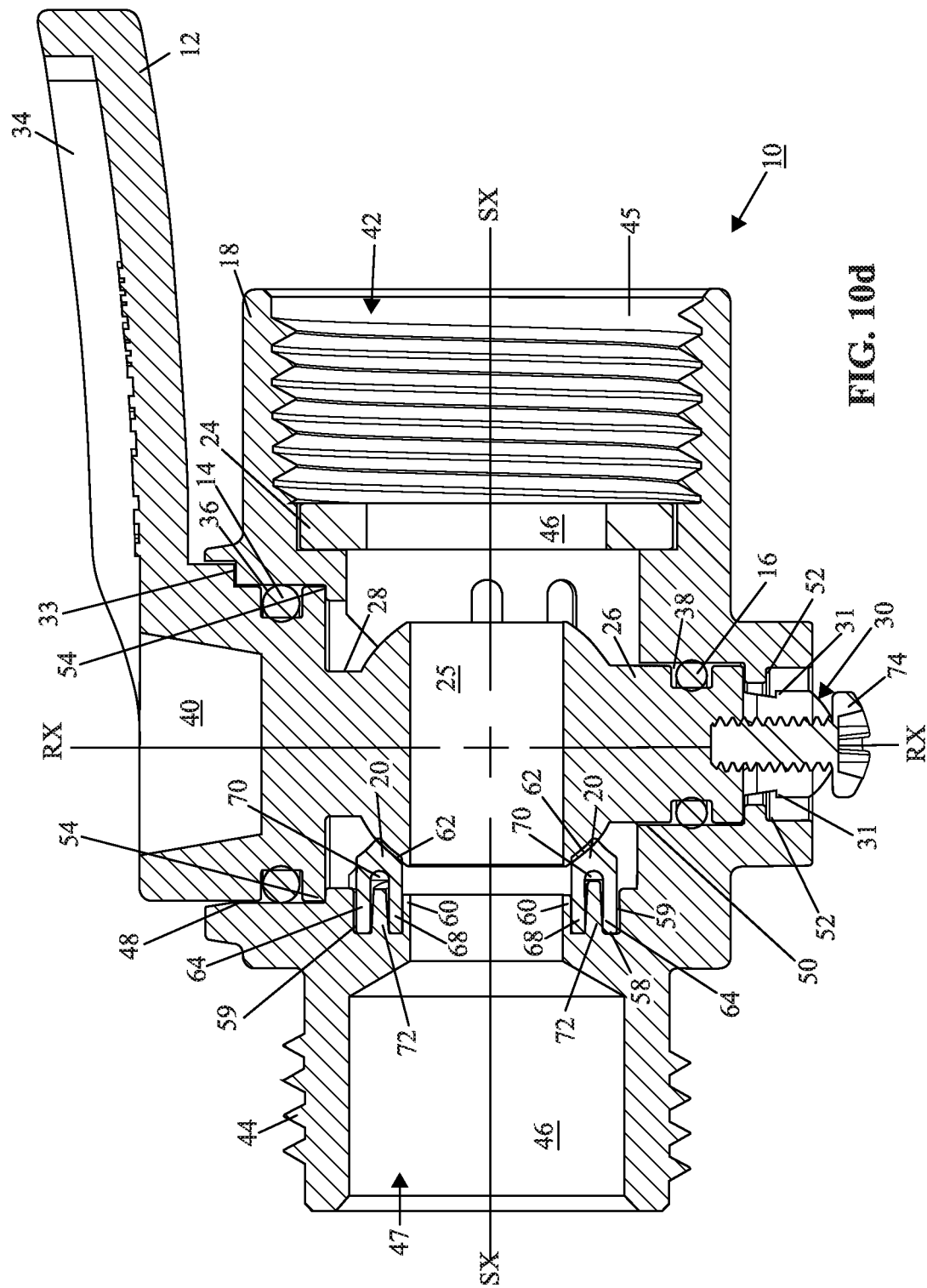
FIG. 10d is a sectional view of one embodiment of the valve with the third embodiment of the ball valve seat and an alternative to ball assembly retention arrangement.
Figure 11:
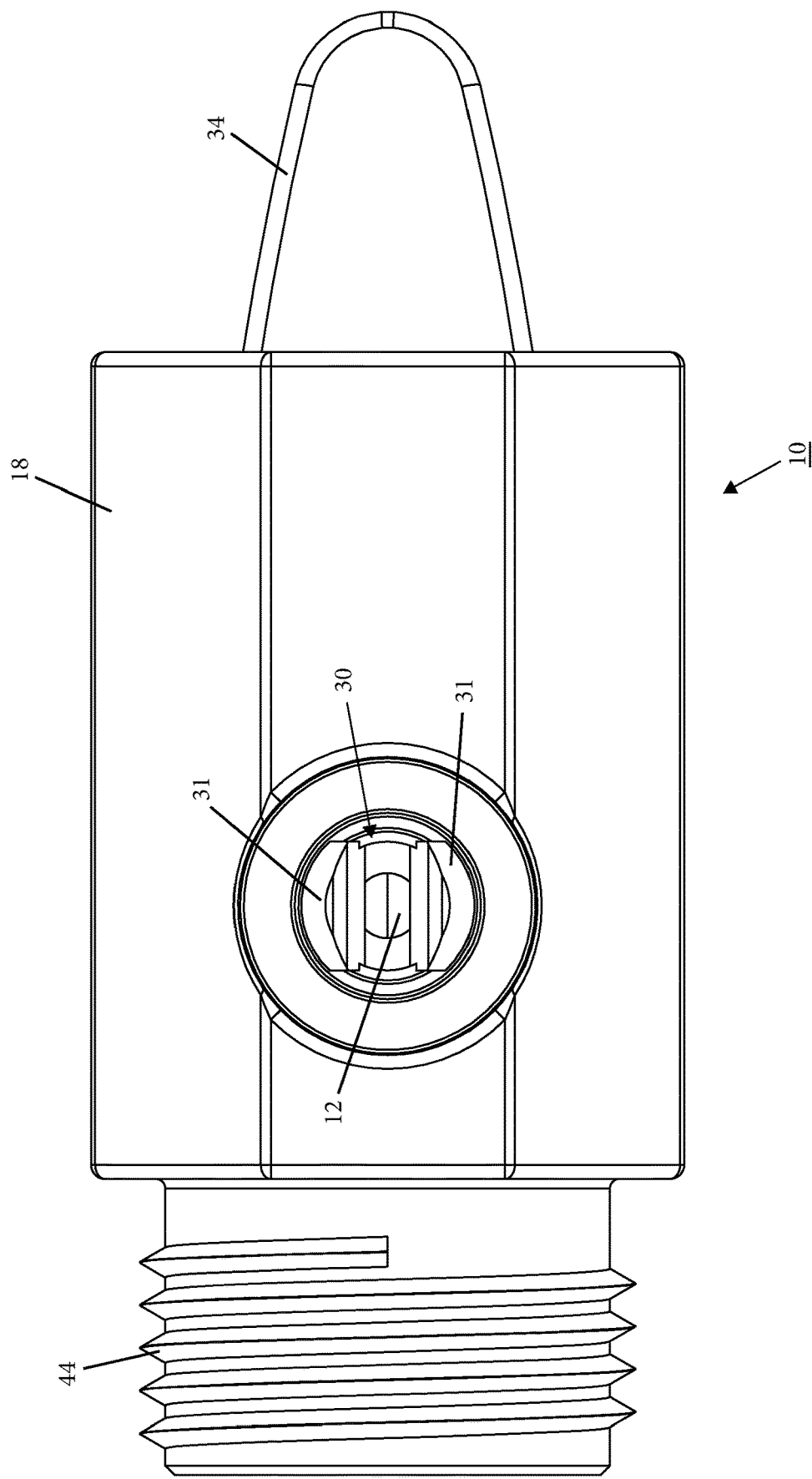
FIG. 11 is a bottom view of the valve.

Referring now to FIG. 10c, a third embodiment of valve seat 57 and corresponding ball seal 20 will be described. In the second embodiment a singly cylindrical wall 60 is offset from the flow surface 66 as shown in FIG. 10b. In the third embodiment wall 60 remains in the same position as the first embodiment. However, a second cylindrical wall 72 is provided as shown. With this embodiment, the configuration of seal 20 remains generally the same. However, channel 70 engaged by wall 72 and wall 60 again forms a portion of surface 66 as shown.

Referring to 10d, a second embodiment of an additional element for holding projections 31 in contact with edge 52 is shown in particular a screw 74 is engaged between projections 31 to force them outward. The use of screw 74 is not necessary under certain operational pressures, but may be useful depending upon the particular configuration of projections 31 and edge 52. In another embodiment, edge 52 would have a surface with slants from the outside of its perimeter downwardly to the inside of its perimeter, and projections 31 would include surfaces which slant upwardly from the inside of catch arrangement 30 to the outside edges of projections 31. This arrangement allows projections 31 to hook the surface of the surface of edge 52 such that as water pressure ends to force ball assembly 12 upwardly, projections 31 are further forced outwardly and in contact with edge 52.

In another embodiment a method for assembling the valve of the embodiments described above is provided. In particular the current valve is designed to avoid labor by avoiding the step of inserting a ball valve portion into a valve housing, aligning the portion to a handle and shaft and then attaching the portions. Of particular value in avoiding this step is the seat 57 and seal 20 configurations discussed in detail above. The method involves applying seal 20 to seat 57, lubricating seat 57 and/or ball 24, applying seals 14 and 16 to ball assembly 12 and then inserting assembly 12 into housing 18 along axis RX. The interaction of seal 20 and seat 57 prevents seal 20 from moving out of place when ball 24 moves into engagement with seal 20 while seal 16 and shaft 26 fully engage bearing surface 50, and projections 31 are flexed inwardly will passing by edge 52 to cause projections 31 to engage with the surface of edge 52 to restrict motion of assembly 12 relative to housing 18 when valve 10 is pressurized. Subsequently, if necessary, screw 74 can be engaged between projections 31. Alternatively and push pin type connector may be used in place of screw 74. As a further alternative, catch arrangement 30 may take a form which does not include projections 31. Rather, arrangement 30 may include a hole which is engaged with a fastener such as a screw or push-pin which includes a head which interacts directly with the surface of edge 52 to restrict motion of assembly 12 relative to housing 18 when valve 10 is pressurized.

In various exemplary embodiments, the relative dimensions, including angles, lengths and radii, as shown in the Figures are to scale. Actual measurements of the Figures will disclose relative dimensions and angles of the various exemplary embodiments. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A ball valve comprising:
    a one-piece, integrally-molded, plastic flow-control assembly including a partial ball defining a first cylindrical flow passage having a central axis, a lower cylindrical shaft extending from one side of the partial ball and having a central, rotational axis which is perpendicular to the central axis, a catch arrangement extending from the lower cylindrical shaft including a first and second projection, an upper cylindrical shaft having a first radius and extending from a side of the partial ball opposite to the one side and being disposed about the rotational axis, and a bearing journal having a second radius greater than the first radius, extending from the upper cylindrical shaft and disposed about the rotational axis, and a user-handle extending from the bearing journal, the lower cylindrical shaft including a first cylindrical groove and the bearing journal including a second cylindrical groove;
    a first seal located in the first cylindrical groove;
    a second seal located in the second cylindrical groove;
    a one piece valve body defining a second cylindrical flow passage having a second central axis, the second cylindrical flow passage extending between first and second ends of the valve body having an internal thread at the first end and an external thread disposed about the valve body at the second end, the valve body defining lower and upper bearing surfaces disposed about the rotational axis, the lower bearing surface being adjacent to a cylindrical ridge which is engaged by the first and second projections to prevent movement of the flow-control assembly from within the valve body, the first and second projections being biased into engagement with the cylindrical ridge by a retainer between the first and second projections, the upper bearing surface being disposed about the upper cylindrical shaft and the second seal and including a shoulder to limit movement, and define a position, of the flow-control assembly within the valve body along the rotational axis, wherein the valve body defines a cylindrical valve seat groove defined by a first cylindrical seat surface and a first cylindrical wall adjacent to the second cylindrical flow passage, the valve seat groove being located adjacent to the partial ball; and
    a ball seal including a first surface configured to conform to a surface of the partial ball and a first cylindrical extension which is located within the valve seat groove, the flow-control assembly, seals and valve body cooperating to permit rotation of the flow-control assembly between (i) a closed position wherein the partial ball and the ball seal cooperate to prevent fluid flow through the first and second cylindrical flow passages such that fluid pressure within the ball valve forces the partial ball against the ball seal, and (ii) open positions wherein the flow-control assembly is rotated within the valve body such that fluid can flow through the first and second cylindrical flow passages;
    wherein when the ball valve is pressurized with fluid at the first end and the ball valve is closed, the partial ball, the seals and the valve body cooperate to prevent fluid through the second cylindrical flow passage, between the lower bearing surface and the lower cylindrical shaft and between the upper bearing surface and the upper cylindrical shaft.

2. The valve of claim 1, wherein the first cylindrical wall defines a portion of the surface of the second cylindrical flow passage.

3. The valve of claim 1, further comprising a second cylindrical wall located within the valve seat groove and defining first and second channels, wherein the first cylindrical extension is located in the first channel and the ball seal includes a second extension located in the second channel.

4. The valve of claim 1, wherein the first and second seals are rubber O-rings.

5. The valve of claim 1, wherein the ball seal is fabricated from EPDM.

6. A two piece valve and seal assembly comprising:
    a one-piece, integrally-formed flow-control assembly including a partial ball defining a first cylindrical flow passage having a central axis, a lower cylindrical shaft extending from one side of the partial ball and having a central, rotational axis which is perpendicular to the central axis, an upper cylindrical shaft having a first radius and extending from a side of the partial ball opposite to the one side and being disposed about the rotational axis, and a bearing journal having a second radius greater than the first radius, extending from the upper cylindrical shaft and disposed about the rotational axis, and a user-handle extending from the bearing journal, the lower cylindrical shaft including a first seal located in a first cylindrical groove and the bearing journal including a second seal located in a second cylindrical groove;

a one piece, integrally formed valve body defining a second cylindrical flow passage having a second central axis, the valve body defining lower and upper bearing surfaces disposed about the rotational axis, the upper bearing surface being disposed about the upper cylindrical shaft and the second seal and including a shoulder to limit movement, and define a position of the flow-control assembly within the valve body along the rotational axis, wherein the valve body defines a cylindrical valve seat groove defined by a first cylindrical seat surface and a first cylindrical wall adjacent to the second cylindrical flow passage, the valve seat groove being located adjacent to the partial ball, wherein a ball seal includes a first surface configured to conform to a surface of the partial ball and a first cylindrical extension which is located within the valve seat groove, the flow-control assembly, seals and valve body cooperating to permit rotation of the flow-control assembly between (i) a closed position wherein the partial ball and the ball seal cooperate to prevent fluid flow through the first and second cylindrical flow passages such that fluid pressure within the valve forces the partial ball against the ball seal, and (ii) open positions wherein the flow-control assembly is rotated within the valve body such that fluid can flow through the first and second cylindrical flow passages; and a flow control retainer that is a multi-prong catch integrally formed with a lower cylindrical shaft catch interacting with a surface of the valve body that is proximate to the lower bearing surface to retain the flow-control assembly within the valve body, the retainer allowing the flow-control assembly to be inserted into the valve body and retained in the valve body after insertion, wherein the retainer is a screw which engages the lower cylindrical shaft a head of the screw interacting with the surface of the valve body that is proximate to the lower bearing surface to retain the flow-control assembly within the valve body.

7. The valve and seal assembly of claim 6, wherein the first cylindrical wall defines a portion of a surface of the second cylindrical flow passage.

8. The valve and seal assembly of claim 6, further comprising a second cylindrical wall located within the valve seat groove and defining first and second channels, wherein the first cylindrical extension is located in the first channel and the partial ball seal includes a second extension located in the second channel.

9. The valve and seal assembly of claim 6, wherein the first and second seals are rubber O-rings, and the flow control retainer and valve body are injection molded from plastic.

10. The valve and seal assembly of claim 6, wherein the ball seal is fabricated from EPDM.

* * * * *